United States Patent [19]

Hazen

[11] 4,308,791
[45] Jan. 5, 1982

[54] ENCLOSED FINISHING VAT FOR CHEESE MAKING

[75] Inventor: Gretz L. Hazen, Fort Atkinson, Wis.

[73] Assignee: Dec International, Inc., Madison, Wis.

[21] Appl. No.: 159,235

[22] Filed: Jun. 13, 1980

Related U.S. Application Data

[63] Continuation of Ser. No. 20,803, Mar. 15, 1979, abandoned.

[51] Int. Cl.³ .................. A01J 25/08; A01J 25/10; A01J 25/11
[52] U.S. Cl. ........................ 99/459; 99/462; 99/465; 366/186; 366/261
[58] Field of Search ............ 366/186, 189, 194–196, 366/261, 289, 308, 312, 309; 99/452, 456, 459–463, 465, 466

[56] References Cited

U.S. PATENT DOCUMENTS

| | | | |
|---|---|---|---|
| 2,032,678 | 3/1936 | Wegener | 366/261 |
| 2,488,053 | 11/1949 | Damrow | 99/456 |
| 2,774,140 | 12/1956 | Nessler et al. | 99/459 |
| 3,193,928 | 7/1965 | Collins | 366/261 |
| 3,476,364 | 11/1969 | Thomson | 366/261 |
| 3,490,751 | 1/1970 | Thomson | 366/261 |
| 3,563,399 | 2/1971 | Shivers | 366/186 |
| 4,050,369 | 9/1977 | Mulvihill et al. | 99/463 |

Primary Examiner—Philip R. Coe
Assistant Examiner—Timothy F. Simone
Attorney, Agent, or Firm—Andrus, Sceales, Starke & Sawall

[57] ABSTRACT

An enclosed finishing vat for cheese making. The vat has a generally oval configuration and an agitating unit is mounted for reciprocating movement on a frame above the vat and includes a vertical drive shaft that extends through a slot in the top of the vat. The lower end of the drive shaft carries a rotatable support arm and at each end of the arm both a stirring paddle and an unloading paddle are pivotally mounted. The stirring paddle and unloading paddle extend in opposite directions from the respective end of the arm. In operation, the agitating unit reciprocates along the length of the vat, and the arm is rotated such that the stirring paddles lead in the direction of rotation and stir the curd, while the unloading paddles trail and float on the curd. To unload the curd from the vat, a discharge opening in the bottom of the vat is opened and the direction of rotation of the arm is reversed, whereby the unloading paddles lead in the direction of rotation and scrape along the bottom of the vat and deliver the curd through the discharge opening.

9 Claims, 8 Drawing Figures

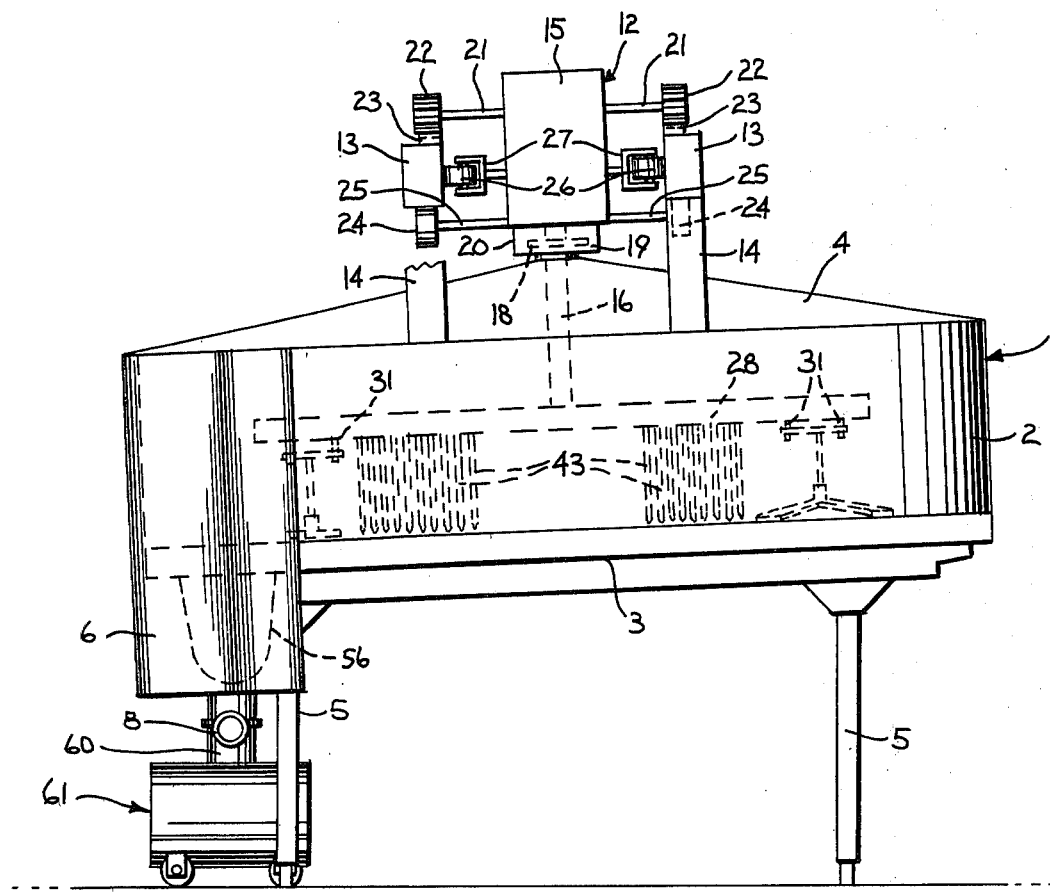
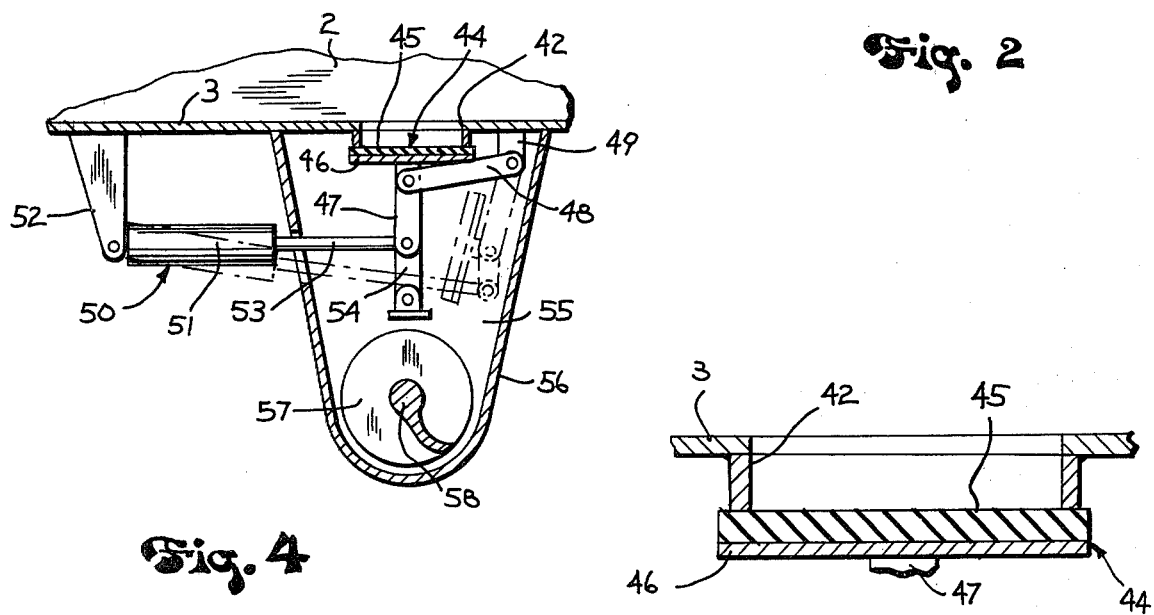

ENCLOSED FINISHING VAT FOR CHEESE MAKING

This is a continuation of application Ser. No. 020,803, filed Mar. 15, 1979, abandoned.

BACKGROUND OF THE INVENTION

In the conventional cheese making process for producing cheddar, colby or stirred curd cheese, the curd and whey are transferred from the cheesemaking vat to a finishing vat where the curd is slowly agitated and the whey is drawn off. Subsequently, the cheddar type curd is milled and, in all cases, the moist curd is agitated by forking paddles which travel the length of the vat on a reciprocating carriage. In the past, the curd was removed from the vat by manual shoveling and placed in hoops. Recently, as disclosed in U.S. Pat. No. 3,853,241, finishing vats have been constructed with an open end enclosed by a removable or hinged door. With a vat of this type, the curd, instead of being shoveled out of the vat, is pushed out of the open door into a series of hoops or onto a conveyor system.

The conventional finishing vat has an open top, and thus, the cheese curd is subjected to contamination from the environment. In addition, due to the open top, there is a certain amount of evaporation that occurs unless the finishing vat is equipped with a water heated jacket to maintain the curd in a warm state and prevent evaporation.

In the past, separate implements have been utilized for the stirring and the removal of the curd from the finishing vat. The normal stirring implements take the form of small fork-like paddles or rakes, and to discharge the curd, the stirring paddles must be removed and replaced by pusher blades which extend the width of the vat. The removal of the stirring paddles and replacement with the pusher blades requires considerable labor and results in a certain amount of downtime for the vat.

SUMMARY OF THE INVENTION

The invention relates to an improved finishing vat for cheese making. In accordance with the invention, the vat has a generally flat bottom wall, an oval side wall and a top which encloses the upper end of the side wall. A reciprocating agitating unit is mounted on the frame above the vat and includes a vertical drive shaft that extends through a slot in the top wall of the vat. Mounted on the lower end of the drive shaft is a horizontal arm, and a stirring paddle and an unloading paddle are pivotally connected to each end of the arm. The stirring paddle and unloading paddle are positioned so that they extend in opposite circumferential directions from the respective ends of the arm.

During the cheese making operation, the agitator unit is reciprocated along the length of the vat, and the arm is rotated in a direction such that the stirring paddles lead in the direction of rotation and stir the curd, while the unloading paddles trail and float on the curd.

To unload the curd, a discharge opening in the bottom wall is opened and the direction of rotation of the arm is reversed, so that the unloading paddles lead in the direction of rotation and scrape along the bottom wall and deliver the curd to the discharge opening.

As the finishing vat is totally enclosed, contamination of the curd is virtually eliminated, and a more sanitary operation is achieved. Due to the elimination of contamination, better quality control can be obtained.

As the vat is closed, evaporation is reduced and the curd will remain at a relatively constant temperature, thus eliminating the need for auxiliary heating, such as a water jacket, which is normally associated with the conventional finishing vat. Further, drying of the curd on the side walls of the vat is minimized.

As both the stirring paddles and the unloading paddles are permanently attached to the support arm, there is no necessity for removal and replacement of implements during the cheese making operation.

In addition, the vat, because it is totally enclosed, can be readily cleaned-in-place, including the implements attached to the arm.

Other objects and advantages will appear in the course of the following description.

DESCRIPTION OF THE DRAWINGS

The drawings illustrate the best mode presently contemplated of carrying out the invention.

In the drawings:

FIG. 2 is an end view of the vat;

FIG. 4 is a section taken along line 4—4 of FIG. 1;

FIG. 5 is a view taken along line 5—5 of FIG. 3;

DESCRIPTION OF THE PREFERRED EMBODIMENT

Figure 1:
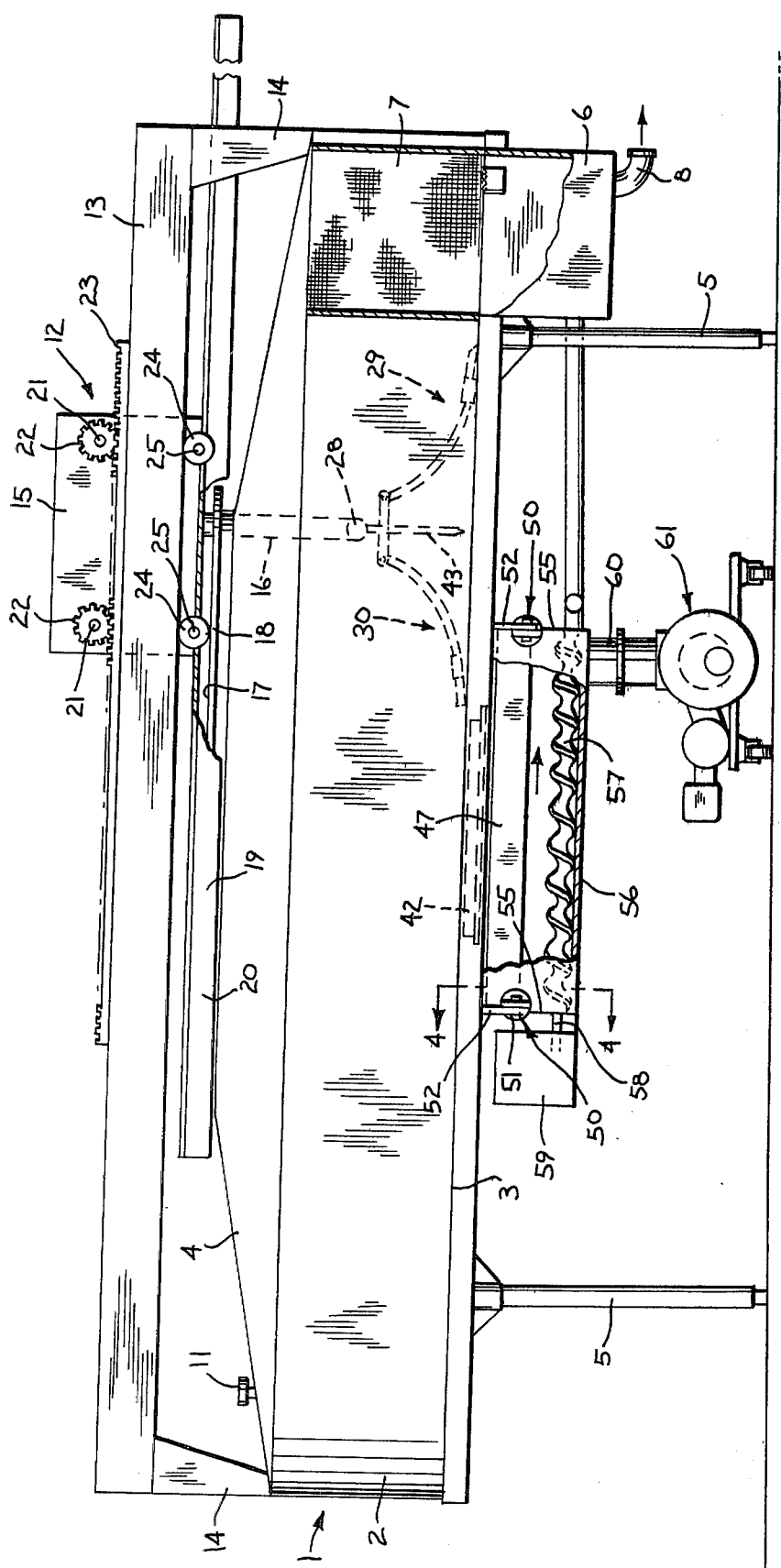
FIG. 1 is a side elevation of the enclosed finishing vat of the invention with parts broken away.

The drawings illustrate an enclosed finishing vat 1 for making cheese, such as cheddar, colby, or stirred curd, which includes a generally oval side wall 2, a flat bottom wall 3, and a dome-shaped top 4. The vat is supported on a series of legs 5 from the foundation or ground.

A whey tank 6 is located at one end of the vat, and the bottom wall 3 slopes in a direction toward the whey tank to permit the whey to drain to the tank. A screen 7 is positioned across the whey tank to prevent the curds from entering the tank. Located in the lower end of the tank 6 is a drain 8.

Figure 6:
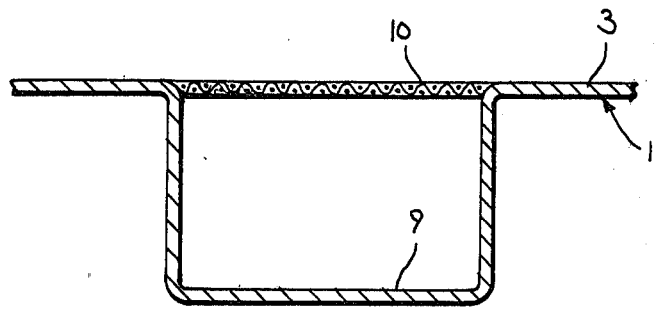
FIG. 6 is a section taken along line 6—6 of FIG. 1 and showing the mechanism for enclosing the discharge opening.

To facilitate draining of the whey toward the whey tank 6, a trough 9 is formed in the bottom wall 3 and extends longitudinally of the vat. As best shown in FIG. 6, the upper end of the trough is enclosed by a screen 10 which prevents the curds from entering the trough.

The curds and whey are introduced into the vat 1 through an inlet conduit 11 located in the top wall 4.

Figure 3:
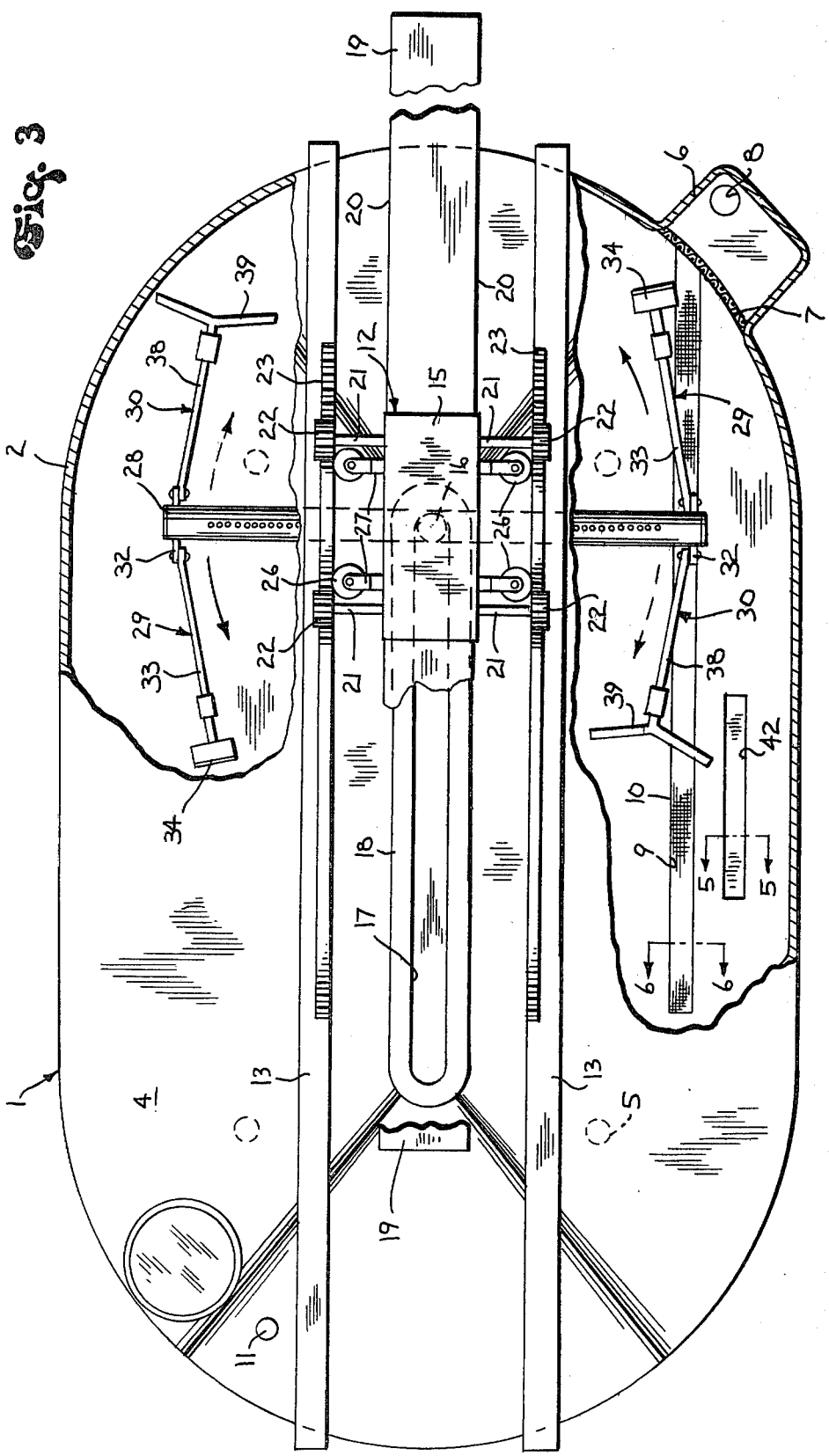
FIG. 3 is a top plan view of the vat with parts broken away in section.

The curds in the vat are adapted to be stirred by an agitating unit 12 which travels in a reciprocating path along the length of the vat. The agitator unit 12 is supported on a framework which includes a pair of longitudinal beams 13 that are supported from the top 4 through vertical legs 14. A motor and gear transmission unit 15 is mounted for travel in a reciprocating path on the longitudinal beams, and the unit 15 serves to drive a vertical shaft 16 which extends through a slot 17 in the top wall 4. As best shown in FIG. 3, the slot 17 is bordered by an upstanding flange 18 and the motor and gear unit 15 carries an elongated shield 19 having downwardly extending side flanges 20 which are located outwardly of the flanges 18 bordering slot 17. The mating flanges 18 and 20 provide a closure for the slot as the motor and gear unit 15 moves in its reciprocating path of travel.

To drive the agitator unit 12 in its reciprocating path, drive shafts 21 extend outwardly from opposite sides of the unit 15 and carry gears 22, which engage racks 23 mounted on the longitudinal beams 13. The motor and gear unit 15 is guided in movement by rollers 24 mounted on shafts 25 that project laterally from opposite sides of unit 15, and the rollers ride on the lower surface of the beams 13. Lateral restraint is provided by rollers 26 carried by brackets 27 which ride against the side surfaces of the respective beams. The reciprocating drive for the agitator unit is in itself conventional, and forms no part of the present invention.

The lower end of the vertical drive shaft 16 carries a rotating, horizontal cross arm 28, and both a stirring paddle assembly 29 and an unloading paddle assembly 30 are mounted on each end of the rotating arm 28.

Figure 7:
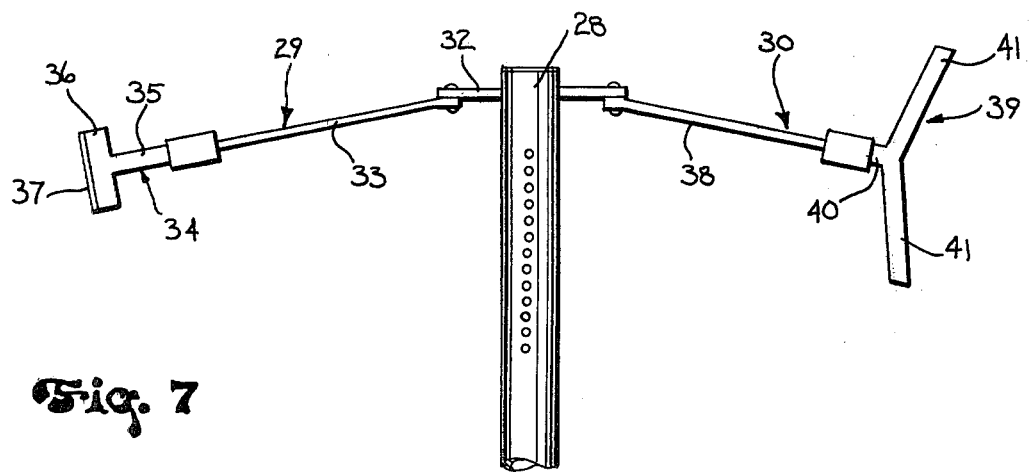
FIG. 7 is an enlarged fragmentary top plan view of the arm carrying the stirring paddle and the unloading paddle.
Figure 8:
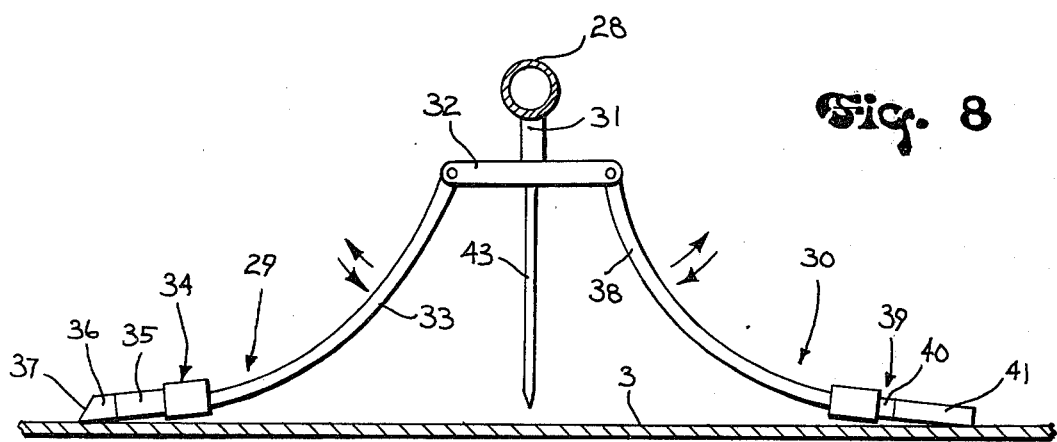
FIG. 8 is a side elevation of the structure shown in FIG. 7.

To connect the stirring paddle assembly 29 and the unloading paddle assembly 30 to the arm 28, a pair of vertical support rods 31 extend downwardly from each end of the arm 28 and a horizontal bar 32 is attached to the lower ends of the supports 31 and extends laterally of the arm. The stirring paddle assembly 29 includes a curved arm 33 that is pivotally connected to the end of the bar 32 and a stirring paddle 34 is mounted on the end of the arm 33. As shown in FIGS. 7 and 8, each stirring paddle 34 is generally T-shaped having a stem portion 35 and a head 36 with a sharpened lower edge 37. The edge 37 is adapted to ride along the bottom wall 3 of the vat as the arm 28 is rotated in the stirring direction, so that the paddle 34 will stir and agitate the curd. The pivotal connection with bar 32 enables the paddle 34 to float in a vertical direction.

Each unloading paddle assembly 30 includes an arm 38 which is pivoted to bar 32 and an unloading paddle 39 is attached to the end of the arm. The paddle 39 has a stem 40 and a pair of legs 41 which extend outwardly from the stem at an obtuse angle, as shown in FIG. 7.

The arms 33 and 38 which carry the stirring paddle 34 and the unloading paddle 39 are located at an angle of about 80° with respect to the axis of the arm 28 so that the paddles will not engage the side wall when the arm 28 is rotated at the end of the stroke of travel of the agitator unit.

In addition to the stirring paddles 34 and unloading paddles 39, a series of hinged rod rakes 43 are pivotally mounted on the arm 28 and during rotation serve to rake through and break up and maintain the curds in a granular condition.

During the stirring operation, the agitator unit 12 is moved in a reciprocating path of travel along the length of the vat and simultaneously the arm 28 is rotated about the axis of the drive shaft 16. The rotation is in the direction of the solid arrow in FIG. 3, and the stirring paddles 34 lead in the direction of rotation and scrape along the bottom of the vat to stir and agitate the curd, while the unloading paddles 39 will trail and float on the curd due to the pivotal connection of the arms 38 with the horizontal bar 32. This free floating action also tends to break up clumps of curd. During the stirring, residual whey will be expelled from the curds and will drain into trough 9.

When it is desired to unload the curds from the vat, the direction of rotation of the drive shaft 16 is reversed, as shown by the dashed arrow in FIG. 3, so that the unloading paddles 39 lead in the direction of rotation and scrape along the bottom and deliver the curd to a discharge opening 42 located in the bottom wall 3.

As best illustrated in FIG. 5, the discharge opening 42 is bordered by a downwardly extending flange and a pivoted door 44 is adapted to enclose the discharge opening 42. The door 44 is composed of an upper resilient pad 45, which bears against the lower edge of flange to provide a seal, and a stainless steel backing plate 46.

The backing plate 46 is carried by an elongated vertical plate 47 which has a length greater than the length of the discharge slot 42. The ends of the plate 47 are pivotally connected to brackets 48 which in turn are pivoted to lugs 49 that extend downwardly from the bottom surface 3 of the vat.

The door is adapted to be moved between a closed and an open position by a hydraulic cylinder unit 50, best shown in FIG. 4, which includes a cylinder 51 attached through lugs 52 to the bottom wall 3 of the vat, and a piston rod 53 which is mounted for sliding movement within the cylinder. The outer end of each piston rod is connected to the pivot between the plate 47 and a lug 54, the lower end of which is pivoted to the respective end wall 55 of a hopper 56. By extending the piston rod, the plate 47 and the door 44 will be pivoted downwardly to a generally vertical open position, as illustrated by the phantom lines in FIG. 4, to permit the curd to be discharged through the discharge slot 42.

The door and mounting mechanism is contained within the hopper 56 which is secured to the lower surface of the bottom wall 3. Mounted for rotation within the hopper is an auger or screw conveyor 57 having a shaft 58 which extends through the end wall 55 of the hopper and is driven by a motor 59. A discharge conduit 60 is connected to the opposite end of the hopper. The auger 57 acts to convey the curd to the discharge conduit 60 where it falls by gravity into a pneumatic blower unit 61 that conveys the curd to the desired location.

As the finishing vat is totally enclosed, contamination of the product is virtually eliminated and a more sanitary operation results. The closed vat also reduces evaporation, and maintains the curd at a relatively constant temperature so that auxiliary heating in the form of a water jacket is not required with the finishing vat of the invention.

Both the stirring paddles and the unloader paddles are permanently affixed to the rotating arm, and stirring and unloading is accomplished by merely reversing rotation of the drive shaft. This eliminates the necessity of removing and replacing implements for the stirring and unloading operations as is necessary in conventional finishing vats. This reduces the downtime for the vat.

Because the vat is totally enclosed, it can readily be cleaned-in-place, including the stirring and unloading paddles which are attached to the rotating arm.

Various modes of carrying out the invention are contemplated as being within the scope of the following claims particularly pointing out and distinctly claiming the subject matter which is regarded as the invention.

I claim:

1. A finishing vat for cheese making, comprising a vat having a generally flat bottom wall and a side wall and adapted to contain a quantity of cheese curd and whey, an agitator unit mounted to move in a reciprocating path relative to the vat, said agitator unit including a vertical drive shaft and reversible drive means to selectively rotate the shaft in a stirring direction and an opposite unloading direction, an arm secured to the lower end of the shaft and disposed within the vat, a stirring paddle pivotally connected for floating vertical movement to the arm, said stirring paddle having a curd engaging edge facing in said stirring direction and disposed to stir the curd as the shaft is rotated in said stirring direction, a whey discharge outlet in the bottom wall of the vat, a curd discharge outlet in the bottom wall of the vat, and separate from the whey outlet, and an unloading paddle pivotally connected for free vertical movement to the arm, said unloading paddle having a curd engaging unloading edge facing in said unloading direction and disposed to ride along the bottom wall of the vat to deliver the entire quantity of curd in the vat through the curd discharge outlet when the shaft is rotated in the unloading direction, stirring and unloading selectively occurring on reversal of said drive means and without removal of said paddles from said arm.

2. The vat of claim 1, wherein at least one of said edges is elongated and generally concave in shape with the central longitudinal portion of said one edge being disposed in a direction toward said arm from a plane extending through the outer longitudinal extremities of said one edge.

3. The vat of claim 1, wherein said side wall has a pair of generally straight side sections and curved end sections, said curd discharge opening being elongated and disposed generally parallel to said side sections, said curd discharge opening having a length such that the path of travel of said unloading paddle will continuously intersect said curd opening during reciprocating movement of said agitating unit.

4. The vat of claim 1, and including a door to enclose the curd discharge outlet and movable between a closed position and an open position, and means to move the door from the closed to the open position.

5. The vat of claim 4, and including a hopper mounted on the lower surface of the bottom wall of the vat and enclosing said door, the curd discharged through the door being received in said hopper.

6. The vat of claim 5, and including a conveyor in the hopper for moving the curd to a collection site.

7. The vat of claim 1, wherein said reversible drive means is located on the outside of the vat, and said vat includes a top wall, said top wall is provided with a slot to receive said vertical drive shaft.

8. The vat of claim 7, and including a shield attached to the reversible drive means to enclose the slot as the agitator unit moves in its reciprocating path.

9. The vat of claim 1, wherein the central portion of the arm is connected to said drive shaft and both a stirring paddle and an unloading paddle are pivotally mounted on each end of the arm and extend laterally of said end of the arm in opposite directions.

* * * * *